UNITED STATES PATENT OFFICE.

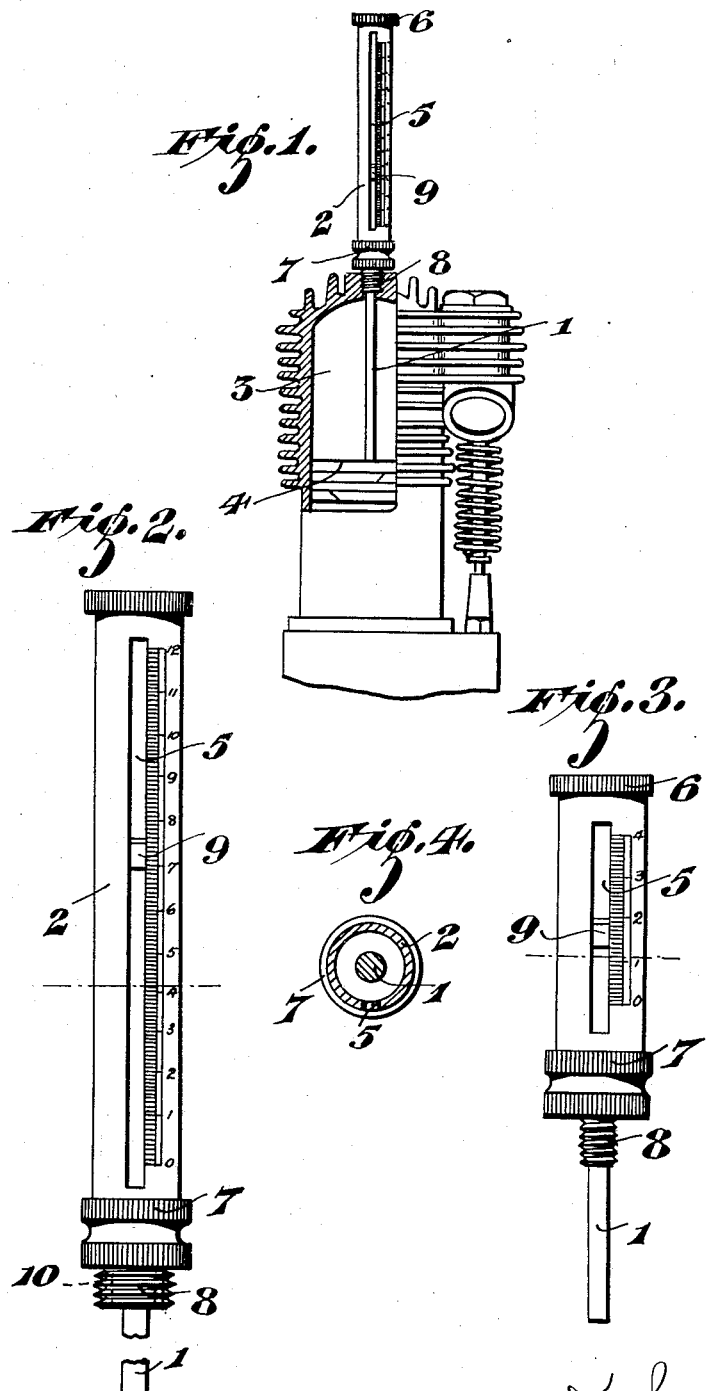

ALFRED JOHN KEMUEL WILESMITH, OF LEIGH, NEAR WORCESTER, ENGLAND.

INDICATING DEVICE.

1,184,154. Specification of Letters Patent. Patented May 23, 1916.

Application filed November 3, 1913. Serial No. 799,025.

*To all whom it may concern:*

Be it known that I, ALFRED JOHN KEMUEL WILESMITH, a subject of the Kingdom of Great Britain, residing at Pigeon House, Leigh, near Worcester, in the county of Worcester, England, engineer, have invented a new and useful Improved Indicating Device, of which the following is a specification.

The present invention has relation to devices for assisting in setting the ignition and valves of internal combustion engines of the type in which a rod or wire adapted to rest upon the piston is slidingly mounted within a guide or casing in such a manner that upon said rod or wire being allowed to rest upon the piston and the guide to rest upon the cylinder or be suitably supported the movements of the piston are indicated by the movement of the rod within the guide. In such arrangement it has been usual to place an ordinary scale against the guide to ascertain the exact movements of the piston.

The object of the present invention is to provide a guide having markings or indication engraved or placed thereon whereby the separate scale is dispensed with and these markings or indications are preferably in the form of millimeters and centimeters and are placed down one of the sides of the guide.

If desired a chart may be employed in conjunction with present device having the markings and upon this chart is a list of numbers representing the different strokes of internal combustion engines and opposite each number is the angle of the connecting rod from the vertical when the piston has descended say one millimeter. From this it will be seen that when the angle of the rod is given and the stroke of the motor is known the piston position can readily be found and so the valves and ignition fixed accordingly.

Further according to this invention a second series of markings or indications may if desired be placed on the other side or half of the guide and these second series of markings are adapted to correspond with the millimeter and centimeter markings and represent the angles through which the crank pin passes when the piston has moved through the number of millimeters represented by the corresponding and opposite millimeter indication on the guide.

It will be obvious that the angles vary according to the stroke of the piston and for this purpose a number of different instruments or devices may be provided each having a different series of angles for the various strokes but if desired one instrument only may be employed and may be capable of receiving one of a number of different slides or scales having the various angles.

A further feature of the present invention consists in an arrangement whereby the guide portion may be attached or screwed into the cylinder.

In order that this invention may be clearly understood and readily carried into practice, reference may be had to the appended explanatory sheet of drawing, upon which—

Figure 1 is a part sectional elevation of an internal combustion engine cylinder illustrating the present device in use. Fig. 2 is an elevation of a device according to this invention particularly suitable for setting the valves. Fig. 3 is an elevation of a device particularly suitable for setting the ignition, and Fig. 4 is a transverse section through the devices illustrated in Figs. 2 and 3.

According to a convenient embodiment of the present invention a sliding rod wire tube or equivalent member 1 is incorporated with a gage or graduated face 2 which can be attached to the cylinder 3 and said rod or equivalent member is adapted to rest upon the piston 4 in such a manner that the movements of the latter can be recorded or indicated upon the gage which is preferably marked in millimeters as illustrated in Fig. 1. Thus supposing for example it is desired to time the spark so that same breaks when the piston has descended three millimeters, the engine is turned or moved until the piston has descended the said amount by the gage in which position the magneto points are set to break. If however the angle of the connecting rod from the vertical is given for setting the ignition and valves a chart as aforestated is employed in conjunction with the gage, upon this chart is a list of numbers representing the different strokes of internal combustion engines, and opposite each number is the angle of the connecting rod from the vertical when the piston has descended say one millimeter as hereinbefore. From this it will be understood that when the angle is given at which the valves or ignition are to operate, and the stroke of the motor is known the position of the piston can readily be found and so the valves set by the gage in the manner aforestated. For example, supposing the motor to have a stroke of 75 millimeters then according to the chart the angle of the connecting rod, when the piston has descended one millimeter is 2.4 degrees. Thus supposing again the angle is given as 7.2 degrees at which the valves or ignition are to operate it will be obvious on glancing at the chart that the piston has descended three millimeters and can be set in that position and the valves and ignition set as aforestated.

The chart may be set out as follows:—

| 1 mm. of a 70 mm. stroke engine | —2.571° movement of crank pin. |
|---|---|
| " " " " 71 " " " " | 2.535 " " " " |
| " " " " 72 " " " " | 2.5 " " " " |
| " " " " 73 " " " " | 2.465 " " " " |
| " " " " 74 " " " " | 2.432 " " " " |
| " " " " 75 " " " " | 2.4 " " " " |
| " " " " 76 " " " " | 2.368 " " " " |
| " " " " 77 " " " " | 2.350 " " " " |
| " " " " 78 " " " " | 2.307 " " " " |
| " " " " 79 " " " " | 2.277 " " " " |
| " " " " 80 " " " " | 2.25 " " " " |
| " " " " 81 " " " " | 2.222 " " " " |
| " " " " 82 " " " " | 2.195 " " " " |
| " " " " 83 " " " " | 2.168 " " " " |
| " " " " 84 " " " " | 2.142 " " " " |
| " " " " 85 " " " " | 2.117 " " " " |
| " " " " 86 " " " " | 2.093 " " " " |
| " " " " 87 " " " " | 2.063 " " " " |
| " " " " 88 " " " " | 2.045 " " " " |
| " " " " 89 " " " " | 2.022 " " " " |
| " " " " 90 " " " " | 2.0 " " " " |
| " " " " 91 " " " " | 1.978 " " " " |
| " " " " 92 " " " " | 1.956 " " " " |
| " " " " 93 " " " " | 1.933 " " " " |
| " " " " 94 " " " " | 1.914 " " " " |
| " " " " 95 " " " " | 1.894 " " " " |
| " " " " 96 " " " " | 1.875 " " " " |
| " " " " 97 " " " " | 1.855 " " " " |
| " " " " 98 " " " " | 1.836 " " " " |
| " " " " 99 " " " " | 1.818 " " " " |
| " " " " 100 " " " " | 1.8 " " " " |
| " " " " 105 " " " " | 1.714 " " " " |
| " " " " 110 " " " " | 1.636 " " " " |
| " " " " 115 " " " " | 1.565 " " " " |
| " " " " 120 " " " " | 1.5 " " " " |

The gage may be in the form of a tube 2 having a longitudinal slot 5 down the center thereof and such tube may be provided with a screw cap or cover 6 at its upper extremity and a screw cap or cover 7 at the lowest extremity capable of longitudinal adjustment, the said lower member being centrally drilled for the reception of the sliding rod 1 and also being screw threaded externally at 8 to enable same to be screwed into the compression tap or sparking plug orifice. The one end of the sliding rod 1 is adapted to rest upon the piston while the other is provided with a small plunger or guide which slides within the tube and this guide is provided with a small projection 9 working or sliding along the longitudinal slot 5. The small projection is provided with a marking as also is the edge or edges of the slot in the tube and thus it will be seen in operation upon the tube 2 being screwed into the cylinder and the rod allowed to rest upon the piston, the movements of the latter are indicated by the projection 9 within the slot 5.

In order to avoid any compression in the cylinder when the gage is in position, three or other suitable number of holes 10 are drilled in the cap or cover 7 on the gage which screws into the cylinder and thus enables all the compression to be released.

One gage may if desired be employed for timing both the valves and the ignition, but it is preferable to employ two separate gages for the two purposes as illustrated in Figs. 2 and 3. In the case of the separate gage for timing or setting the ignition it will be obvious that only the uppermost positions of the piston are required and so a very short gage can be employed as shown in Fig. 3, but in the case of the gage for timing valves the whole range of the piston is required for setting the valves to operate at both top and bottom positions of the piston and so a gage of greater length is required as shown in Fig. 2.

It will be understood that I have shown and described the preferred form of my invention, but it will be understood further that I do not limit myself to the arrangement or details herein described except where clearly limited by the appended claims.

What I claim as my invention and desire to secure by Letters Patent is:—

1. A device for assisting in setting or timing the ignition and valves of an internal combustion engine, comprising in combination, a guide casing adapted to be screwed into the cylinder of an internal combustion engine and having a calibrated slot extending longitudinally thereof and a rod loosely disposed within said guide casing and adapted to be moved longitudinally thereof by the movement of the engine piston within said cylinder.

2. The combination with an internal combustion engine of a device for assisting in setting or timing the ignition and valves comprising a guide casing temporarily attached to the cylinder of the internal combustion engine and having a calibrated slot extending longitudinally thereof, an indicating member disposed within said guide casing and adapted to be actuated by the movement of the engine piston to indicate upon the said calibrated slot the position of the piston within said cylinder.

3. The combination with an internal combustion engine of a device for assisting in setting or timing the ignition and valves comprising a calibrated member attached to the cylinder and in communication with the explosion chamber thereof, and an indicating member actuated by the movement of the engine piston and adapted to register on said calibrated member the movement of the piston within the cylinder.

In witness whereof I have hereunto set my hand in the presence of two witnesses.

ALFRED JOHN KEMUEL WILESMITH.

Witnesses:
 Lewis D. Goold.
 Hollis T. Brown.